(12) United States Patent
Kappertz et al.

(10) Patent No.: US 11,799,698 B2
(45) Date of Patent: Oct. 24, 2023

(54) PULSE-AMPLITUDE MODULATION TRANSCEIVER, FIELD DEVICE AND METHOD FOR OPERATING THE PULSE-AMPLITUDE MODULATION TRANSCEIVER

(71) Applicant: Endress+Hauser Flowtec AG, Reinach (CH)

(72) Inventors: Jannis Kappertz, Aesch (CH); Alexander Stutz, Kienberg SO (CH); Markus Wucher, Lörrach (DE)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 17/755,987

(22) PCT Filed: Nov. 9, 2020

(86) PCT No.: PCT/EP2020/081423
§ 371 (c)(1),
(2) Date: May 13, 2022

(87) PCT Pub. No.: WO2021/099150
PCT Pub. Date: May 27, 2021

(65) Prior Publication Data
US 2022/0400034 A1 Dec. 15, 2022

(30) Foreign Application Priority Data
Nov. 19, 2019 (DE) .................... 10 2019 131 216.7

(51) Int. Cl.
*H04L 25/03* (2006.01)
*H04L 25/49* (2006.01)
(52) U.S. Cl.
CPC ...... *H04L 25/0307* (2013.01); *H04L 25/4917* (2013.01)

(58) Field of Classification Search
CPC ............ H04L 25/0307; H04L 25/4917; H04L 2025/0349; H04L 25/03038; H04L 25/03146
(Continued)

(56) References Cited

U.S. PATENT DOCUMENTS 9,692,521 B1 * 6/2017 Zhou .................... H04B 10/532
9,966,705 B2 * 5/2018 Maeda ................. H01R 13/665
(Continued)

FOREIGN PATENT DOCUMENTS

EP 3406060 A1 11/2018

OTHER PUBLICATIONS

Wang, et al., Advanced Digital Signal Processing for Reach Extension and Performance Enhancement of 112 Gbps and Beyond Direct Detected DML-Based Transmission, Journal of Lightwave Technology, vol. 37, No. 1, Jan. 1, 2019, 7 pp.

*Primary Examiner* — Emmanuel Bayard
(74) *Attorney, Agent, or Firm* — Mark A. Logan; Endress+Hauser (USA) Holding, Inc.

(57) ABSTRACT

A PAM transceiver configured to process an electrical data signal having at least three states includes an electronic circuit comprising: a data interface configured to connect to a duplex communication channel; a first circuit section connected to the data interface; and a second circuit section connected to the data interface. The first circuit section includes an equalizer for compensating for distortions in the data signal and an interpreter downstream of the equalizer for recognizing symbols. The second circuit section includes a delay unit for time-shifting the data signal and an MMA processor for recognizing a signal phase of the data signal. The first circuit section and the second circuit sections are routed to the MMA processor. The second circuit section has (Continued)

a finite impulse response filter configured to monotonize an impulse response of the communication channel.

12 Claims, 4 Drawing Sheets

(58) Field of Classification Search
USPC .................. 375/219–220, 262, 371, 372
See application file for complete search history.

(56) References Cited

U.S. PATENT DOCUMENTS

| | | | |
|---|---|---|---|
| 2002/0021767 A1* | 2/2002 | Greiss ................... | H04L 25/063 375/350 |
| 2003/0212947 A1* | 11/2003 | Schenk ................. | H04L 7/0062 714/786 |
| 2008/0075160 A1* | 3/2008 | Yamaguchi .............. | H04B 3/06 375/233 |
| 2008/0240318 A1* | 10/2008 | Shoor ............... | H04L 25/03343 375/355 |
| 2015/0215138 A1* | 7/2015 | Dorman ............ | H04L 25/03076 375/233 |
| 2016/0352557 A1* | 12/2016 | Liao .................. | H04L 25/03057 |
| 2017/0331619 A1* | 11/2017 | Azenkot .............. | H04L 7/0331 |
| 2017/0373827 A1* | 12/2017 | Azenkot ............. | H04L 25/0224 |

* cited by examiner

PULSE-AMPLITUDE MODULATION TRANSCEIVER, FIELD DEVICE AND METHOD FOR OPERATING THE PULSE-AMPLITUDE MODULATION TRANSCEIVER

CROSS-REFERENCE TO RELATED APPLICATIONS

The present application is related to and claims the priority benefit of German Patent Application No. 10 2019 131 216.7, filed on Nov. 19, 2019 and International Patent Application No. PCT/EP2020/081423 filed on Nov. 9, 2020, the entire contents of which are incorporated herein by reference.

TECHNICAL FIELD

The invention relates to a pulse-amplitude modulation transceiver, a field device with such a pulse-amplitude modulation transceiver, as well as a method for operating such a pulse-amplitude modulation transceiver.

BACKGROUND

Pulse-amplitude modulation, or PAM for short, is a known method for transmitting information, wherein a transmitter encodes information on, for example, an electrical signal by means of PAM, said signal being received and decoded by a receiver.

PAM signals have several states in the form of different signal levels and can also have more than two states. For example, in 'DSL Simulation Techniques and Standard Development for Digital Subscriber Line,' published in Macmillan Technical Publishing, 1998, D. Walter and Y. Chen describe a PAM transceiver for generating and processing PAM signals. Such PAM methods offer the advantage of a higher information density as well as the possibility of setting up states with positive and negative voltages so that energy transmission between different PAM transceivers can be minimized. However, the higher information density is secured at the price of a smaller voltage difference between two adjacent states.

As a result, PAM signals are susceptible to signal distortions caused by the communication channel. This can be compensated if an impulse response of the communication channel is known, but this impulse response is not constant and depends, for example, on an ambient temperature and on how the communication channel is designed. In particular when the communication channel is changed, a different impulse response of the new communication channel must be expected.

SUMMARY

The object of the invention is therefore to propose a PAM transceiver, a field device with a PAM transceiver, and a method for operating the PAM transceiver, which are insensitive and robust with respect to a variable impulse response of a communication channel or with respect to a change of communication channel.

A PAM transceiver according to the invention configured to process an electrical data signal having at least two states, and in particular at least three states, with an electronic circuit comprises:

a data interface configured to connect to a communication channel, in particular to a duplex communication channel, and configured to digitize received data signals;

a first circuit section connected to the data interface, comprising:
an equalizer for compensating for distortions in the data signal caused by the communication channel;
an interpreter arranged downstream of the equalizer for recognizing symbols transmitted by the data signal;

a second circuit section connected to the data interface, comprising:
a delay unit for time-shifting the data signal;
an MMA processor for recognizing a signal phase of the data signal, having a first input and a second input, wherein the first circuit section is routed to the first input, and wherein the second circuit section is routed to the second input, wherein the data signal comprises a sequence of states, which states in each case represent an information symbol, wherein a pulse of the data signal is assigned to each symbol, wherein
the second circuit section has an adjustable finite impulse response filter,
wherein the adjustable filter has a property to symmetrize the impulse response of the communication channel.

The MMA processor is configured to execute a Mueller-Müller algorithm according to IEEE Transactions on Communications, vol. COM-24, no. 5, May 1976.

Here, symbols S recognized by the interpreter and states Z associated with the data signal are supplied to the MMA processor, wherein the MMA processor outputs values according to the following calculation rule:
$MM = (Z_n - S_{n-1}) - (S_n - Z_{n-1})$, where n or n−1 denotes an n-th or n−1th pulse of the data signal. With a well-adjusted PAM transceiver, MM is equal to 0; values not equal to 0 can be used to adjust the signal phase and/or clocking of the PAM transceiver. However, the MMA processor is dependent on a state transmitted to a state input of the MMA processor being processable by the MMA processor, this being ensured by the filter according to the invention.

The values MM indicate a phase between sampling points of the MMA processor and the data signal.

According to the invention, a finite impulse response filter is therefore connected upstream in the second circuit section and has a property to symmetrize an impulse response of the communication channel so that the MMA processor is able to work correctly.

A symmetrical impulse response of the communication channel is a prerequisite for the MMA processor being able to execute the Mueller-Müller algorithm correctly.

Another requirement is that the impulse response runs monotonically in a time range around a maximum value, wherein the impulse response rises monotonically in a time range corresponding to two pulses (T) before the maximum value, wherein the impulse response decreases monotonically in a time range corresponding to two pulses (T) after the maximum value. However, in most cases, this is already the case or can be accomplished by setting up a low-pass filter. A person skilled in the art can check the monotonicity and, if applicable, set up a low-pass filter within the scope of his technical expertise.

In one embodiment, the filter is adjustable by means of three coefficients,
wherein the coefficients are adjustable, for example, on the basis of a symbol associated with a pulse, of a previous state associated with a directly preceding pulse, and of a later state associated with a subsequent pulse, wherein the filter has, in particular, the property of symmetrizing an "earlier state-symbol—later state" sequence in a state of matching or ideal phase.

A matching or ideal phase is present when an output of the MMA processor is 0 or a value corresponding to a phase angle is less than 5 degrees, and in particular less than 2 degrees and preferably less than 1 degree.

The filter may, for example, be a finite impulse response filter, wherein the data signal supplied to the MMA processor is mixed with itself. The three filter coefficients concern, for example, a number of mixtures, mixing strength, and time-shifting of the mixtures.

The coefficients can, for example, be determined by the equalizer when the PAM transceiver is switched on, and can be transmitted to the filter.

In one embodiment, the equalizer is configured to compare states that are interpreted by the interpreter and associated with respective pulses, with non-interpreted states associated with corresponding pulses and, in the absence of a match, to vary equalization parameters adaptively and thereby create a match.

In this way, the PAM transceiver can respond to a varying impulse response of the communication channel and adjust itself accordingly.

In one embodiment, the first circuit section has a feedback loop from an output of the interpreter to the equalizer.

If the IEEE 802.3-2018 standard must be adhered to, a "state-symbol" assignment is required, which is incorrect in fewer than 10^-9 cases. This is usually not the case before the filter coefficients are adapted or adjusted, since the impulse response of the communication channel is not known. However, if significantly more than one half of all the received states is correctly translated into symbols, a difference between an expected voltage corresponding to a respective symbol and an actually applied voltage can be used to adjust filter coefficients in order to minimize the difference and thereby improve the "state-symbol" assignment. This is also known under the technical term "blind training."

In one embodiment, the three coefficients of the filter can be determined by measuring or knowing the impulse response of the communication channel, or wherein the three coefficients of the filter can be determined by means of adapted equalization parameters of the equalizer.

In one embodiment, the PAM transceiver is configured to determine a clock frequency or a phase of the data signal by means of the MMA processor and to synchronize communication via the communication channel.

In one embodiment, the data interface has an analog/digital converter which is configured to digitize the data signal received from the data interface and to supply it to the first circuit section and also to the second circuit section, wherein the MMA processor is configured to provide the data interface and in particular the analog/digital converter with information about a phase between a sampling point of the MMA processor and the data signal, wherein a second feedback loop is configured to transmit the information to the data interface or to the analog/digital converter.

The information about the phase can then be used to time-shift the data signal with respect to the sampling points and to minimize a phase error.

In one embodiment, the PAM transceiver has an echo suppressor for suppressing signal echoes in the data signal, which are caused by the PAM transceiver, wherein the echo suppressor has two inputs and one output, wherein the output is connected to the first circuit section and to the second circuit section. One input is thus connected to an output side of the data interface, and one input is connected to an input side of the data interface so that any occurring echoes can be reduced.

In one embodiment, the PAM transceiver is configured to process encoded data signals and has a signal encoder and also a signal decoder.

The encoding of the data signal preferably has states whose associated voltage signals are distributed uniformly about a zero voltage. The pseudo-randomness is imprinted on the data signal by means of a signal encoder, which results in a substantially equal distribution of states. A receiving PAM transceiver decodes this pseudo-randomness by means of a decoder and translates the data signal into a machine-readable binary code. The pseudo-randomness ensures that energy transmission between PAM transceivers is low, that a transmitted signal and a received signal do not correlate with one another in the case of duplex transmission, and that the adaptive filter is not disturbed by signal regularities.

A measurement/automation technology field device according to the invention comprises:

a measuring transducer for capturing a measured variable and outputting a measurement signal corresponding to the measured variable;

an electronic measuring/operating circuit for operating the measuring transducer, for evaluating the measurement signal, and outputting measurement values of the measured variable;

a housing for housing the electronic measuring/operating circuit, wherein the electronic measuring/operating circuit comprises a PAM transceiver according to the invention, by means of which the field device is configured to transmit and/or receive a data signal.

The PAM transceiver can, for example, be attached as a module to a remainder of the electronic measuring/operating circuit or, for example, also be arranged as an electronic component on a circuit board of the electronic measuring/operating circuit.

A method according to the invention for the synchronization of a PAM transceiver according to the invention with an incoming data signal comprises the following method steps:

comparing states that are interpreted by the interpreter and associated with respective pulses, with non-interpreted states associated with corresponding pulses and, in the absence of a match, varying equalization parameters adaptively and thereby creating a match in a first method step, determining the three coefficients of the filter by means of adjusted equalization parameters of the equalizer in a second method step, synchronizing the PAM transceiver with the incoming data signal by means of the MMA processor in a third method step.

In one embodiment, the synchronization includes determining a phase or clock frequency of the data signal.

BRIEF DESCRIPTION OF THE DRAWINGS

The invention is now described with reference to exemplary embodiments.

DETAILED DESCRIPTION

Figure 1:
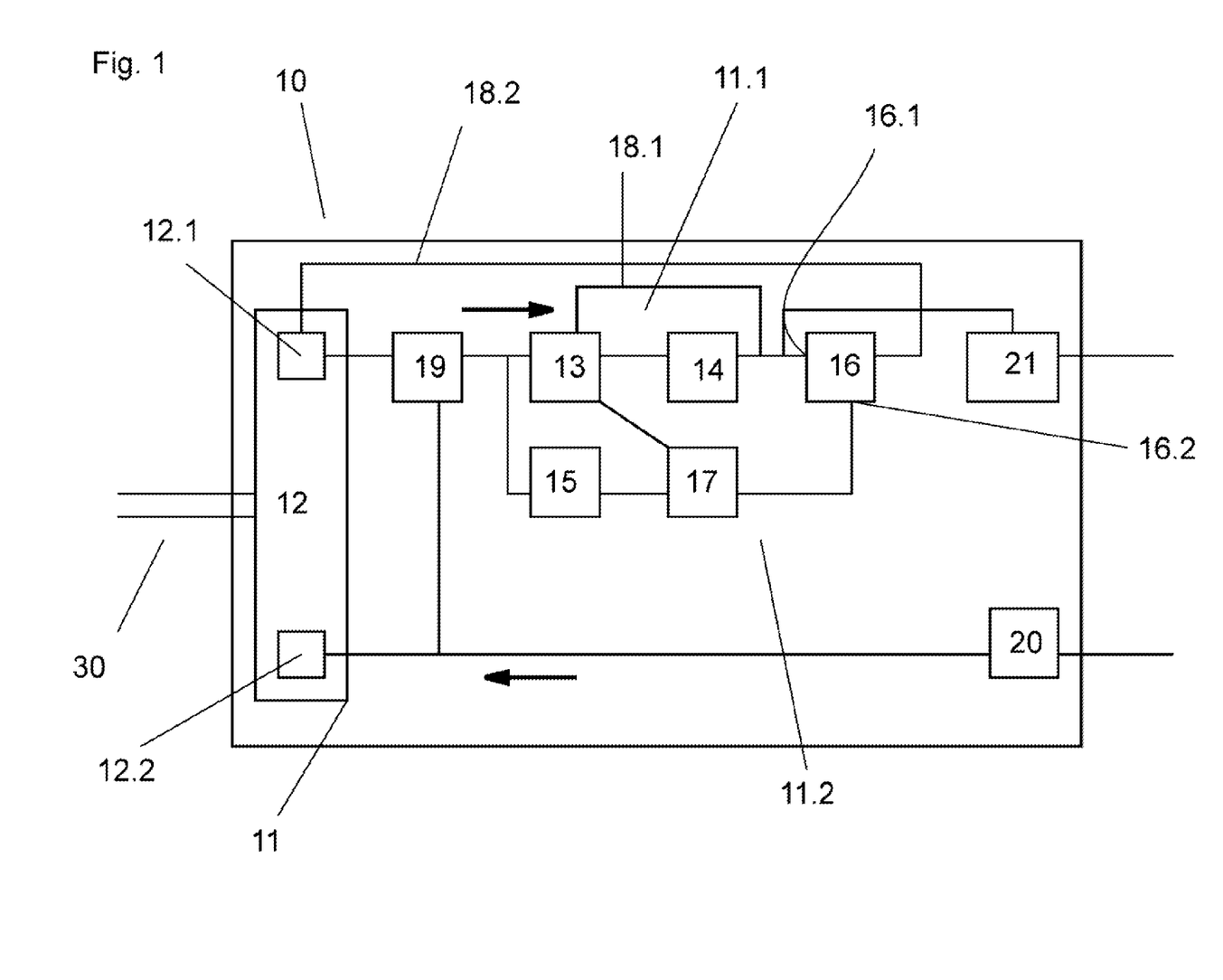
FIG. 1 illustrates an exemplary embodiment of a PAM transceiver according to the present disclosure.

FIG. 1 shows a schematic circuit diagram of an electrical circuit 11 of an exemplary PAM transceiver 10 according to the invention (PAM=pulse-amplitude modulation), which is configured to enable communication by means of a communication channel 30. Data signals transmitted via the communication channel have a pulse-amplitude modulation in which at least two states, and in particular at least three states, are distributed around a voltage zero point; see FIG. 2. The states are in each case given by a voltage level. The data signal preferably has a pseudo-random encoding so that a power transmitted via the communication channel is limited to an unproblematic limit value. The electrical circuit 11 has a data interface 12 to the communication channel 30, wherein an analog/digital converter 12.1 digitizes a received analog data signal. A digital/analog converter 12.2 converts digital information to be transmitted into an analog PAM signal. The electrical circuit 11 has a signal receiving section and in the case of a duplex communication version, as shown here, can have a signal transmitting section. The sections mentioned are indicated by means of the directional arrows. The signal receiving section has a first circuit section 11.1, a second circuit section 11.2, and an MMA processor 16 (short for Mueller-Müller algorithm), wherein the first circuit section is connected to a first input 16.1 of the MMA processor, and wherein the second circuit section is connected to a second input 16.2 of the MMA processor.

After digitization by the analog/digital converter 12.1 in the first circuit section, the data signal D acquired by means of the data interface is at least partially freed of distortions by an equalizer 13 or is at least partially equalized, said distortions being caused by the communication channel. A downstream interpreter 14 interprets the digitized data signal and in each case assigns a symbol to states associated with the pulses of the data signal. The assignment of the symbols is based on voltages of the incoming states or on digital voltage values which represent voltages of the analog data signal. The equalizer can preferably comprise an adaptive filter, which filter sets filter coefficients or equalization parameters such that symbols output by the interpreter match states transmitted to the interpreter. During a learning phase, filter coefficients are gradually adjusted such that the voltage values better and better match the assigned symbols. For this purpose, a first feedback loop 18.1 can be set up as shown by way of example in FIG. 1. Equalizers with adaptive filter are already state of the art, and a person skilled in the art can look for a reasonable implementation for his purposes. The setting of the filter coefficients requires compensation of an impulse response of the data channel.

The data signal D acquired by means of the data interface is delayed by a delay unit 15 in the second circuit section running in parallel to the first circuit section, and at least partially freed by a finite impulse response filter 17 of distortions caused by the communication channel, at least for the range of the impulse response evaluated by the MMA processor.

The adjustable filter 17 has a property to symmetrize an impulse response of the communication channel.

The filter can, for example, be a "finite impulse response" filter, wherein the data signal supplied to the MMA processor is mixed with itself. The filter 17 has three filter coefficients, the three filter coefficients concerning, for example, a number of mixtures, mixing strength, and time-shifting of the mixtures.

According to the invention, these filter coefficients are set on the basis of the filter coefficients of the equalizer 13 or by measuring or knowing the impulse response of the communication channel 30. As shown here, the equalizer 13 can have an electrical data connection to the filter 17 for the purpose of transmitting the filter coefficients to the filter 17. Alternatively, the filter 17 can also have an input for the purpose of inputting data relating to the impulse response or inputting the filter coefficients.

After setting the filter coefficients of the finite impulse response filter 17, an impulse response from a totality of communication channel and second circuit section to a voltage pulse corresponding to a delta distribution or to a rectangular signal in the range of a maximum amplitude of the impulse response has a monotonic or in particular symmetrical course, which is necessary for a correct functioning of the MMA processor or of an underlying Mueller-Müller algorithm according to IEEE Transactions on Communications, vol. COM-24, no. 5, May 1976.

The MMA processor is configured to execute the Mueller-Müller algorithm. Here, symbols S recognized by the interpreter and states Z associated with the data signal are supplied to the MMA processor, wherein the MMA processor outputs values according to the following calculation rule: $MM=(Z_n-S_{n-1})-(S_n-Z_{n-1})$, where n or n−1 denotes an n-th or n−1-th pulse of the data signal. With a well-adjusted PAM transceiver or well-adjusted sampling phase of the PAM transceiver, MM is equal to 0; values not equal to 0 can be used to adjust the signal phase or sampling phase and/or clocking of the PAM transceiver. However, the MMA processor is dependent on a total impulse response in the state input being substantially monotonic in a region of a maximum of the total impulse response.

The PAM transceiver additionally has a signal decoder 21 and, in the case of a duplex communication version, a signal encoder 20. The signal decoder is configured to convert the pseudo-random encoding into a computer-readable binary data signal. The signal encoder is accordingly configured to create from a computer-readable binary data signal a PAM data signal for transmission by means of the communication channel 30.

As shown here, the PAM transceiver can in the case of a duplex communication version have an echo suppressor 19, which is configured to suppress signal echoes occurring internally, since said signal echoes cannot be completely prevented by the data interface.

Figure 2:
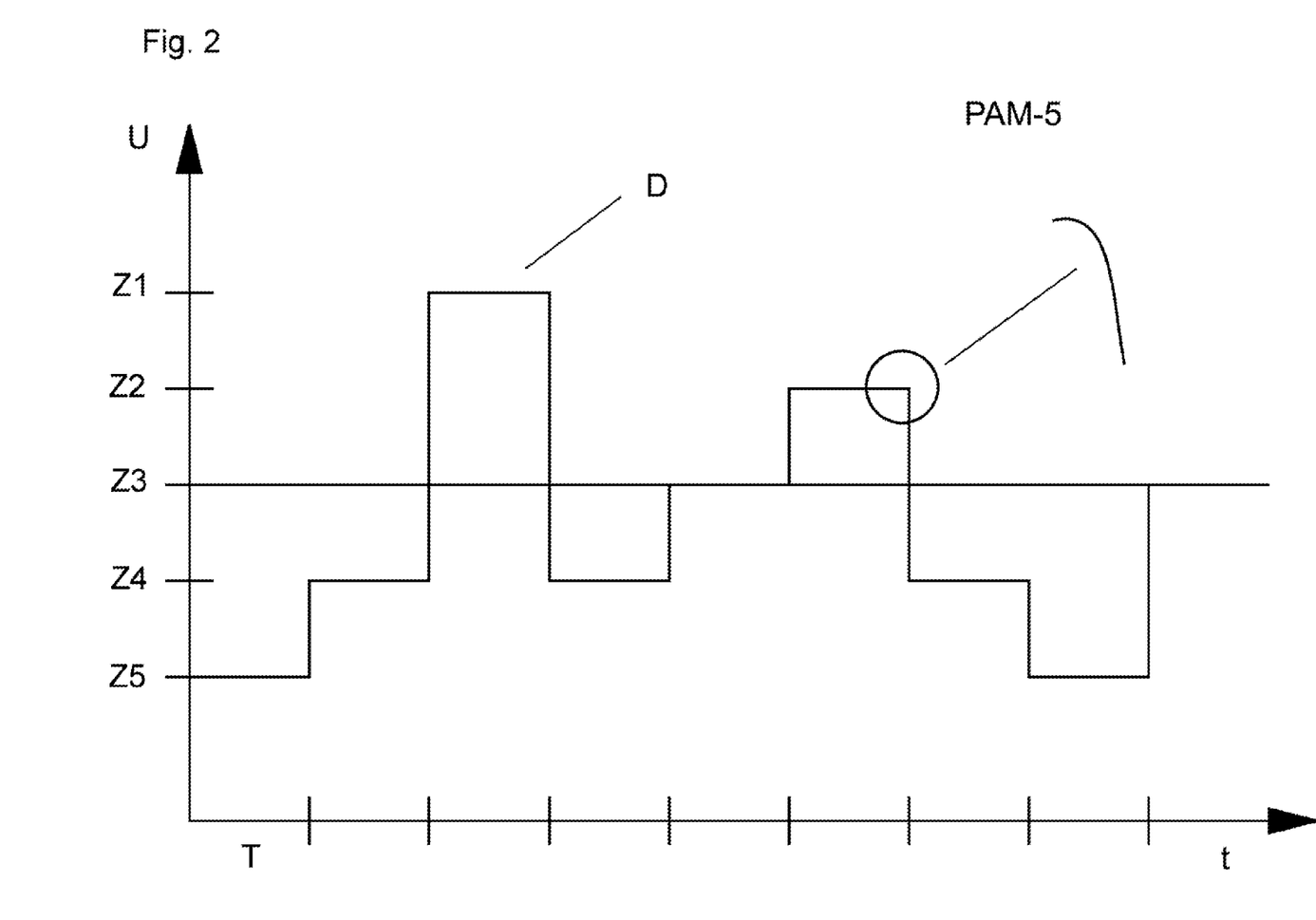
FIG. 2 illustrates an exemplary PAM-5 signal.

FIG. 2 illustrates an exemplary amplitude-modulated data signal, a PAM-5 signal with 5 states Z1 to Z5. Each state has a duration which corresponds to a pulse T of the data signal D. By setting up more than two states, the information density of the data signal is increased. However, due to interferences, the data signal suffers state decay, which is expressed in an initial stage as indicated by a rounding of the signal edges. In the advanced stage, state decay leads to adjacent states merging and mixing. With knowledge of the channel impulse response of the channel, the decay can be compensated at least partially, or the data signal can be largely conditioned. However, PAM signals are not limited to 5 states but can generally have two or more states or signal levels.

Figure 3:
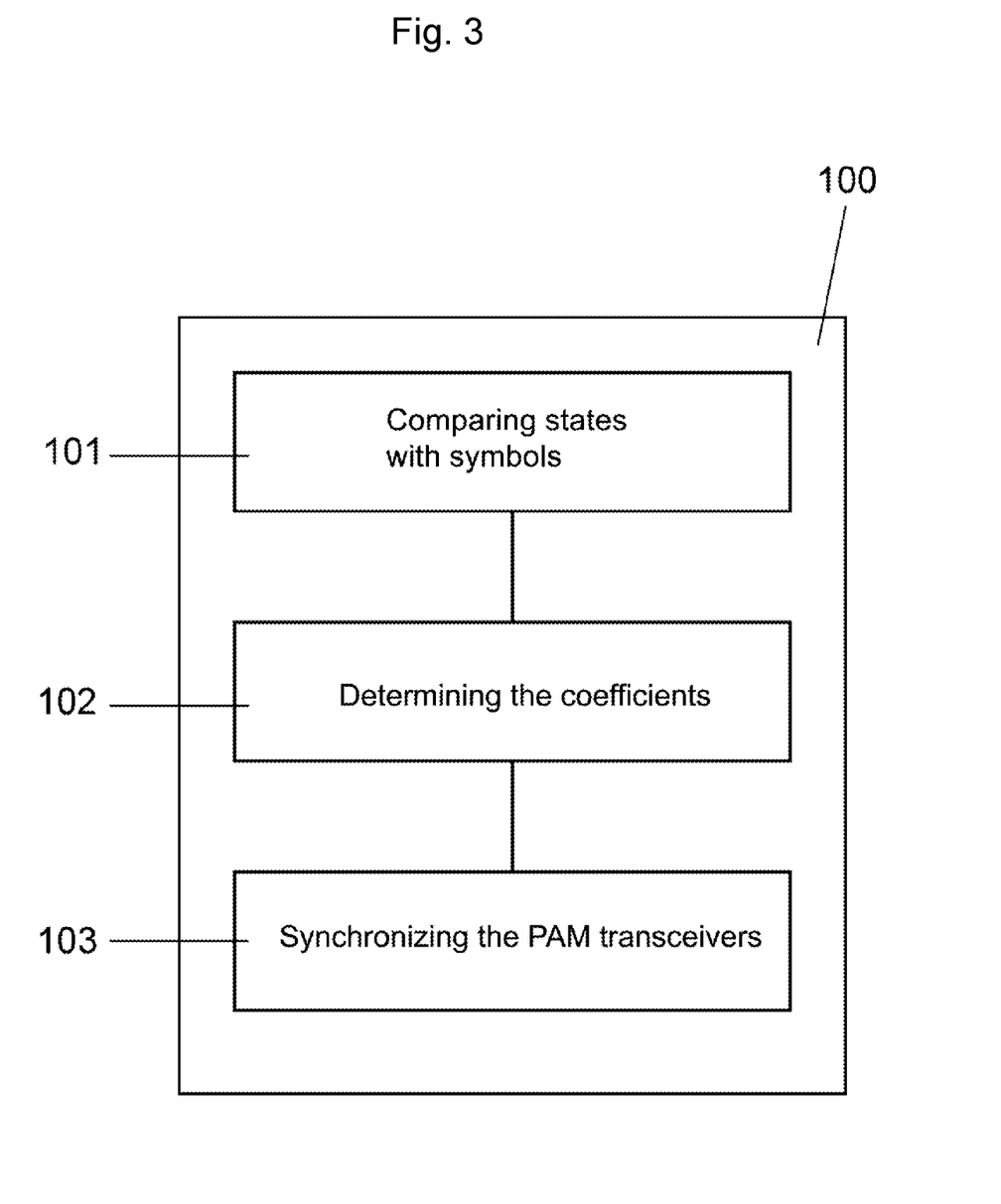
FIG. 3 illustrates an exemplary embodiment of a method according to the present disclosure.

FIG. 3 illustrates an exemplary method 100 according to the invention for synchronizing a receiving PAM transceiver with a transmitting PAM transceiver, wherein symbols output by the interpreter in a first method step 101 are compared with input states associated with the same pulses. In this case, a difference between an expected voltage value corresponding to a respective symbol and an actually applied voltage value can be used in a second method step 102 to adjust filter coefficients in order to minimize the difference between the expected voltage value and the actually applied voltage value and to thereby improve the "state-symbol" assignment. A sequence of method steps 101 and 102 is repeated with subsequent clocking of the data signal until sufficient convergence of the filter coefficients has taken place. A person skilled in the art will select limit values for such a convergence according to his needs.

When the maximum value is reached or undershot, a synchronization between PAM transceivers communicating with one another can be carried out in a third method step 103.

Figure 4:
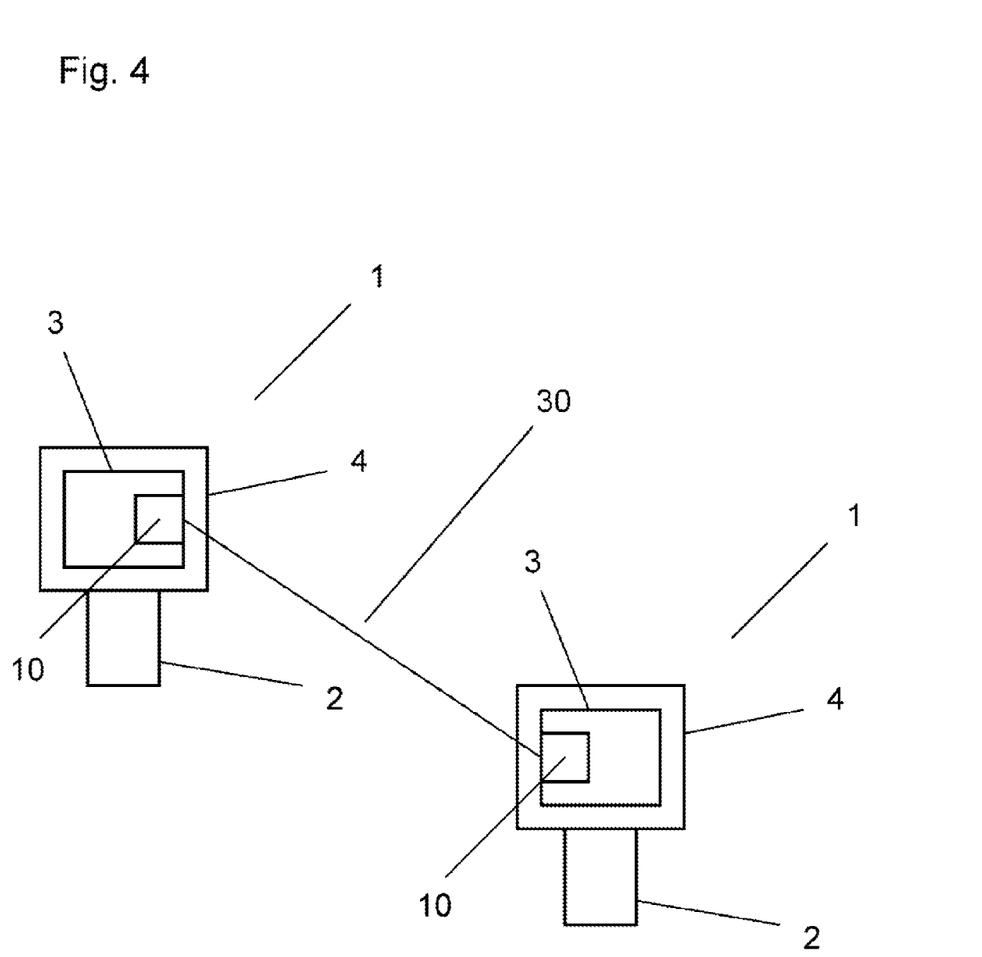
FIG. 4 illustrates two exemplary field devices according to the present disclosure, which are connected by a communication channel.

FIG. 4 illustrates two exemplary field devices 1 of measurement/automation technology, which are connected by means of a communication channel 30. The field devices 1 each have a measuring transducer 2 for capturing a measured variable, wherein the measuring transducers are configured to each output a measurement signal corresponding to the measured variable and to transmit it to an electronic measuring/operating circuit 3 of the respective field device. The electronic measuring/operating circuit is configured to operate the respective measuring transducer and to provide and, if necessary, output measurement values of the measured variables. The field devices in each case have a PAM transceiver 10 according to the invention. In contrast to what is shown here, the communication link 30 can also run indirectly via, for example, an edge device or, in the case of greater distances, via a signal conditioner.

The invention claimed is:

1. A pulse amplitude modulation (PAM) transceiver configured to process a received electrical data signal having at least two states, wherein the data signal comprises a sequence of states, each state representing an information symbol and a pulse of the data signal is assigned to each symbol, the PAM transceiver comprising:
an electronic circuit including a first circuit section and a second circuit section;
a data interface configured to connect to a duplex communication channel and configured to digitize the data signal, the data interface including an analog/digital converter configured to digitize the data signal received by the data interface and to supply the digitized data signal to the first circuit section and to the second circuit section;
wherein the first circuit section is connected to the data interface and the first circuit section includes:
an equalizer to compensate for distortions in the data signal caused by the communication channel; and
an interpreter arranged downstream of the equalizer for recognizing symbols transmitted by the data signal;
wherein the second circuit section is connected to the data interface and the second circuit section includes:
a delay unit for time-shifting the data signal; and
an adjustable finite impulse response filter connected to an output of the delay unit and configured to symmetrize an impulse response of the communication channel; and
a Mueller-Müller algorithm (MMA) processor for recognizing a signal phase of the data signal, the MMA processor having a first input and a second input, wherein an output of the interpreter of the first circuit section is connected to the first input and an output of the adjustable finite impulse response filter of the second circuit section is connected to the second input.

2. The PAM transceiver according to claim 1, wherein the adjustable finite impulse response filter is adjustable by means of three coefficients, wherein the coefficients are adjustable on the basis of a symbol associated with a pulse, of a previous state associated with an immediately preceding pulse, and of a later state associated with an immediately subsequent pulse, and wherein the filter has a property of symmetrizing an "earlier state-symbol-later state" sequence with respect to an impulse response in a state of a matching or ideal phase.

3. The PAM transceiver according to claim 1, wherein the equalizer is configured to compare states that are interpreted by the interpreter and associated with respective pulses with non-interpreted states associated with corresponding pulses and, in the absence of a match, to vary equalization parameters adaptively and thereby create a match.

4. The PAM transceiver according to claim 3, wherein the first circuit section further includes a first feedback loop from an output of the interpreter to the equalizer.

5. The PAM transceiver according to claim 2, wherein the three coefficients of the filter can be determined by measuring or knowing the impulse response of the communication channel, or wherein the three coefficients of the filter can be determined via adjusted equalization parameters of the equalizer.

6. The PAM transceiver according to claim 1, wherein the PAM transceiver is configured to determine a clock frequency of the data signal via the MMA processor and to synchronize communication via the communication channel.

7. The PAM transceiver according to claim 6, wherein the MMA processor is configured to provide the data interface including the analog/digital converter with information about a phase between a sampling point of the MMA processor and the data signal, wherein a second feedback loop is configured to transmit the information to the data interface or to the analog/digital converter.

8. The PAM transceiver according to claim 1, wherein the PAM transceiver is configured to process encoded data signals and has a signal encoder as well as a signal decoder.

9. The PAM transceiver according to claim 1, further comprising:
an echo suppressor for suppressing signal echoes in the data signal caused by the PAM transceiver.

10. A field device of measurement/automation technology, comprising:
a transducer for capturing a measured variable and outputting a measurement signal corresponding to the measured variable;

an electronic measuring/operating circuit for operating the measuring transducer, for evaluating the measurement signal, and outputting measurement values of the measured variable;

a pulse amplitude modulation (PAM) transceiver configured to process a received electrical data signal having at least two states, wherein the data signal comprises a sequence of states, each state representing an information symbol and a pulse of the data signal is assigned to each symbol, the PAM transceiver comprising:

an electronic circuit including a first circuit section and a second circuit section;

a data interface configured to connect to a duplex communication channel and configured to digitize the data signal, the data interface including an analog/digital converter configured to digitize the data signal received by the data interface and to supply the digitized data signal to the first circuit section and to the second circuit section;

wherein the first circuit section is connected to the data interface and the first circuit section includes:
an equalizer to compensate for distortions in the data signal caused by the communication channel; and
an interpreter arranged downstream of the equalizer for recognizing symbols transmitted by the data signal;

wherein the second circuit section is connected to the data interface and the second circuit section includes:
a delay unit for time-shifting the data signal; and
an adjustable finite impulse response filter connected to an output of the delay unit and configured to symmetrize an impulse response of the communication channel; and a Mueller-Müller algorithm (MMA) processor for recognizing a signal phase of the data signal, the MMA processor having a first input and a second input, wherein an output of the interpreter of the first circuit section is connected to the first input and an output of the adjustable finite impulse response filter of the second circuit section is connected to the second input; and a housing for housing the electronic measuring/operating circuit and PAM transceiver, wherein the field device is configured to transmit and/or receive the data signal via the PAM transceiver.

11. A method for synchronizing a pulse amplitude modulation (PAM) transceiver with an incoming data signal, the method comprising:

providing a pulse amplitude modulation (PAM) transceiver configured to process a received electrical data signal having at least two states, wherein the data signal comprises a sequence of states, each state representing an information symbol and a pulse of the data signal is assigned to each symbol, the PAM transceiver comprising:

an electronic circuit including a first circuit section and a second circuit section;

a data interface configured to connect to a duplex communication channel and configured to digitize the data signal, the data interface including an analog/digital converter configured to digitize the data signal received by the data interface and to supply the digitized data signal to the first circuit section and to the second circuit section;

wherein the first circuit section is connected to the data interface and the first circuit section includes:
an equalizer to compensate for distortions in the data signal caused by the communication channel; and
an interpreter arranged downstream of the equalizer for recognizing symbols transmitted by the data signal;

wherein the second circuit section is connected to the data interface and the second circuit section includes:
a delay unit for time-shifting the data signal; and
an adjustable finite impulse response filter connected to an output of the delay unit and configured to symmetrize an impulse response of the communication channel; and a Mueller-Müller algorithm (MMA) processor for recognizing a signal phase of the data signal, the MMA processor having a first input and a second input, wherein an output of the interpreter of the first circuit section is connected to the first input and an output of the adjustable finite impulse response filter of the second circuit section is connected to the second input;

comparing states that are interpreted by the interpreter and associated with respective pulses, with non-interpreted states associated with corresponding pulses and, in the absence of a match, varying equalization parameters adaptively and thereby creating a match in a first method step;

determining the three coefficients of the filter by means of adjusted equalization parameters of the equalizer in a second method step; and synchronizing the PAM transceiver with the incoming data signal by means of the MMA processor in a third method step.

12. The method according to claim 11, wherein the synchronization includes determining a phase of the data signal.

* * * * *